Feb. 3, 1959

J. D. RIESER 2,871,715

VARIABLE SPEED TRANSMISSION MECHANISM AND
INCLOSED SYSTEM OF CONTINUAL FLUID
WETTING OF ACTUATING PARTS

Filed March 4, 1957

INVENTOR.

John D. Rieser

INVENTOR.
John D. Rieser

United States Patent Office

2,871,715
Patented Feb. 3, 1959

2,871,715

VARIABLE SPEED TRANSMISSION MECHANISM AND INCLOSED SYSTEM OF CONTINUAL FLUID WETTING OF ACTUATING PARTS

John D. Rieser, San Francisco, Calif.

Application March 4, 1957, Serial No. 643,870

17 Claims. (Cl. 74—230.17)

This invention relates to motorized variable ratio transmission mechanism, more particularly to a V-belt adjustable speed transmission having adjustable effective diameter pulley structures, mounted in opposed cooperative positions in spaced parallel relationship on a pair of shafts that extend outwardly from a fluid tight housing and/or closure, and having an endless V-belt in driving relationship to the pulley structures to transmit power from one to the other. The pulley structure being comprised of a pair of sections having opposed inclined belt engaging faces for engaging opposite sides of the V-belt at their respective effective diameter positions. And to change the drive ratio between a pair of shafts, a control device operably mounted within the housing being provided.

In my prior Patent 2,637,215, dated May 5, 1953, and my application Serial 372,082, filed August 3, 1953, Patent 2,799,176, I have disclosed a construction in which an electric motor is operably mounted by a fluid tight housing and in which, only one of the pair of parallel mounted shafts extends outwardly from within the fluid tight housing. Nor do these disclosures include the feature of operably mounting their respective control device within said housing and/or closure.

An object of the present invention is to provide an improved and simplified V-belt variable speed transmission mechanism of the V-belt character and having portion of its control means for adjusting the speed ratio between a pair of parallel mounted shafts disposed within a fluid tight housing.

Another object of the present invention is to provide a fluid within the fluid tight housing and in which at least one of the parallel mounted shafts mounts a fluid propulsion device that extends to the fluid so that upon operation of the mechanism causes a portion of the fluid being propelled above the normal level of the fluid pool within the housing and thereby causing continual wetting of surfaces of the control means therein the housing.

Another object of the present invention is to provide an apertured means that is constructed and extended so as to cause of at least a portion of the propelled fluid continually dripping therein and thence transversing therethrough whereby causing a corresponding continual wetting of metal to metal actuating parts of the V-belt variable speed transmission mechaniosm and in which its disposition be such so as to permit of placement and/or removal of an endless V-belt without effecting any dismantling of the continuity of the aperture means.

Another object of the present invention is to provide an apertured means that is constructed and extended so as to cause of at least a portion of the propelled fluid continually entering therein and thence transversing therethrough whereby causing a corresponding continual wetting of the mating surfaces between the pulley half hubs and corresponding surfaces on the shafts, whence the excess fluid returns to the fluid pool within the housing.

Another object of the present invention is to provide an apertured means that is constructed and extended so as to cause of at least a portion of the propelled fluid continually entering therein and thence transversing therethrough while effecting a corresponding continual wetting of at least a portion of the shaft journals disposed in adjacency to both ends of the adjustable effective diameter pulley structure on each of the parallel mounted shafts whence the excessive fluid returns to the fluid pool within the housing.

Another object of the present invention is to provide of the control means being unitized so as to permit of using a simple takeup stud, that upon being manually adjusted effects axial movement of the unitized control means toward and away from the center of the V-belt and in which the takeup stud includes a shank that extends intermediate between the pulley structures mounted on a pair of parallel spaced shafts so that its wrench end be disposed at the free end of the mechanism beyond the control means.

This invention possesses other advantages and has other objects which may be more easily apparent from consideration of the several embodiments of the invention. For this purpose there are outlined several forms. These forms will now be described in detail to illustrate the general principles of the invention, but it is to be understood that this detailed description is not to be taken in a limiting sense as the same is susceptible of modification without departing from the spirit or scope of the invention which is broadly set forth in the appended claims.

The adjustable speed transmission mechanism indicated by the Figures 1, 5 and 7, hereinafter referred to as adjustable ratio transmission mechanism or unit. The unit shown in the Figure 1 generally comprises a driving electric motor 14, a speed change gearing 15 within the fluid inclosure housing 16 and the adjustable speed mechanism 17, of which the numeral 18 indicates the control means, while the numeral 19, indicates the takeup means. The adujstable speed mechanism affords an adjustable drive ratio connection between the motor 14 and the speed change gearing 15 of which, the variable speed range of the power takeoff shaft 20 corresponds to the variable speed range of the adjustable speed mechanism 17. And the numeral 21 designates the mounting feet or base of the unit. Internally the housing 16 confines a fluid means 22, which as will be hereinafter described is caused to be propelled above the normal level of the fluid pool within the housing 16 and thereby causing continual wetting of various surfaces of the metal to metal actuating parts of the unit by said fluid means. And in the Figures 1, 5 and 7 the driving motor indicated represents a readily procurable motor, therefore its detailed structures are not here described.

Figure 1:
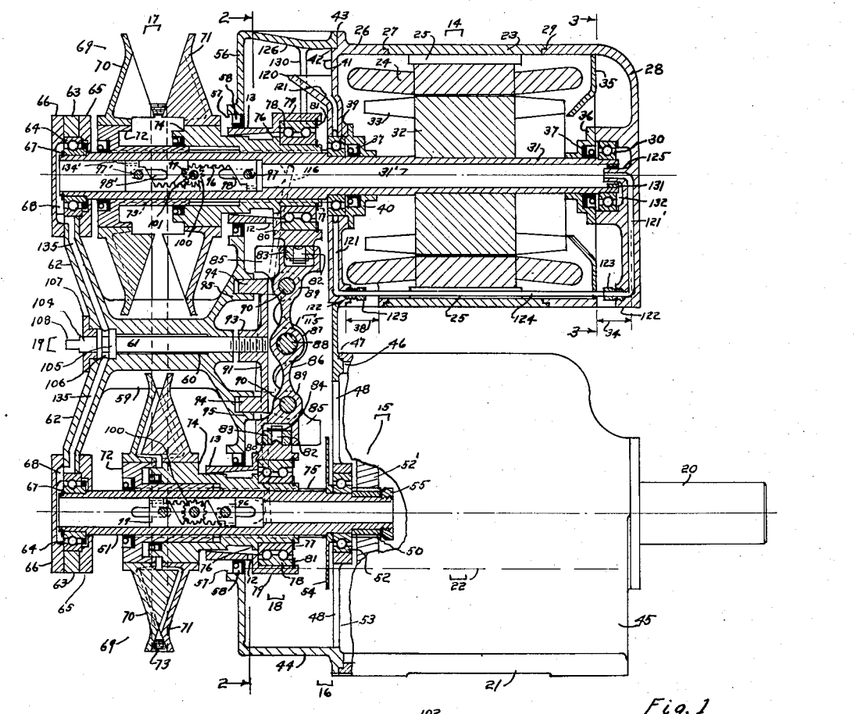
Figure 1 is an elevation view partly in section.

Referring to the Figure 1, the motor 14 is of the round frame footless type, having desired electrical characteristics, of which the frame 23 mounts in usual suitable manner the stator and coils 24, which provides, a series of air ducts 25 between the interior of the frame and the exterior diameter of the stator and coils (only two being shown). One end of the frame 23 being mounted onto an end bell 26 in suitable manner as at 27 and fastened thereto (the fastenings are not shown) and the other end of this frame mounts the end bell 28 in similar suitable manner as at 29 and again the fastenings are not shown. The end bell 28 supportably mounts the bearing 30, which bearing provides a journal support for this end of the constant speed shaft 31. This shaft 31 may also be termed the motor shaft, for it mounts the motor rotor 32, which includes the blades 33. The rotor being suitably fastened onto the shaft 31 in usual manner, so that they rotate as a unit. The lower end of the end bell 28 has an air inlet opening, of which its width is indicated by the arrowed line 34. And in adjacency to an end of the coil 24 the end bell 28 shows an application of an air deflector plate 35 which is shaped to direct the incoming air centrally with respect to the blades 33. This plate 35 may be a part of the cap 36 or a separate plate, however in the present instance the cap 36 mounts a positive bearing seal 37. Altho not shown the cap 36 is to be suitably fastened to this end bell as by screws. The lower end of the end bell 26 has an air outlet opening, of which its width is indicated by the arrowed line 38 and in the present example, this end bell 26 includes an end wall 41, which is suitably fitted to mount the bearing 39 and a cap 40 which in turn also mounts a positive bearing seal 37. The end wall 41 together with the seal forms a closure for this end of the motor. Thus in so far as the motor 14 is concerned, operatively air is drawn into the interior of the motor in regular manner and caused to circulate about the operatively heated motor parts and effect cooling of same, whence the heated air is discharged through the air discharge opening to the atmosphere, as is the usual motor practice, however the present construction provides novel features, as will be hereinafter described concerning continual wetting of the bearings 30 and 39 by the fluid 22, even tho, the axis of the motor 14 be disposed at a higher level than that of the fluid pool 22 within the housing 16.

Figure 4:
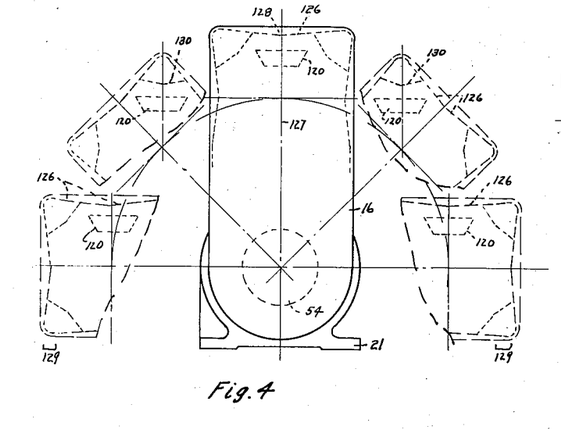
Figure 4 is an end elevation of Figure 1, but showing only the outline of the housing in upright position by means of full lines and indicating by means of dash lines same in four other positions and by means of dotted lines correspondingly indicate the adjustability of the orifice member within the housing.

The end bell 26 is suitably fitted fluid tight into the opening 42 of the housing 16 as at 43 and fastened thereto, however these fastenings are not shown. And in the present example, the housing 16 consists of a rear section 44 and a front section 45. The rear section 44 being suitably fitted fluid tight into the opening 46 of the front section 45 as at 47, and fastened thereto in suitable manner so as to permit of mounting the unit in various positions (hereinafter described) and again the fastenings are not shown. In addition to the opening 42 this end wall of the rear section 44 includes the openings 48, best seen at the Figure 2, which permits of the fluid means 22 reaching into both the front and the rear section to form a continuous fluid pool within the housing 16. And during the shop assembly period, before mounting the end bell 26 into the opening 42, this opening permits of portions of the control means 18 passing therethrough into the housing. The front section 45 includes feet or base members 21 (best seen at the Figure 4) for mounting the unit. And internally this front section 45, suitably mounts a desired speed change gearing 15, of which the first pinion gear 50 is mounted onto an end portion of the variable speed shaft 51. And in mesh with this pinion gear have indicated a fragmentary portion of an intermediate gear 52', which together with other desired gearing, their shafts and journals are suitably mounted within the fluid tight enclosure. It being understood that when speed change gearing be included into the unit, the power takeoff shaft 50 is mounted onto an end portion of the variable speed shown) in the usual manner. And in installations where speeds are satisfied without the use of speed change gearing, it is understood that the variable speed shaft 51 can be altered to extend through the front section 45, and where this front section is not required, the openings 48 can be closed, and to mount such a unit the rear section 44 can be provided with necessary mounting feet or base member. The bearing 52, which is suitably mounted in the front wall 53 of the rear section 44 provides the journal support for this end of the variable speed shaft 51, when speed change gearing is being used. And in adjacency to the bearing 52, the variable speed shaft 51 mounts the propulsion means 54, which extends to the fluid pool within the housing, so that upon operation of the unit causes portion of the fluid being propelled above the normal level of the fluid pool 22, as will be hereinafter described. The lock nut 55, locks the pinion gear 50 together with the inner race of the bearing 52 and the propulsion means 54 onto the variable speed shaft 51, so that they rotate uniformly.

Figure 6:
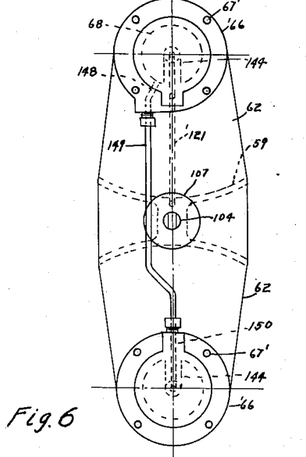
Figure 6 is an end elevation view taken on the line 6—6 of Figure 5.

The rear wall 56 of the rear section 44 at each of the spaced shafts, includes the concentric openings 57 into which are suitably fitted the positive seals 58. And intermediate of these openings 57 the rear wall 56 includes an extension 59, which extends cantilever fashion longitudinally intermediate of the constant speed shaft 31 and the variable speed shaft 51, also see Figure 6 which by means of dotted lines shows the contour of the extension 59. The extension 59 includes an aperture 60 that extends from within the housing 16 to the outward end of the extension 59 and into which extends the shank 61 of the takeup means 19 hereinafter described. And the outward end of the extension 59 has a pair of transverse arms 62, that extend transversely from the outward end of the extension 59 to the rear end of both the constant speed and the variable speed shafts. Also see Figure 6 which shows an end view of these arms. And at each of these shafts, the arms 62 have a hub 63 which are in turn suitably fitted to mount the bearing 64 that in each case provides a journal support for an end of these shafts. See Figure 1 each of the bearings 64 are of the deep groove type and include at one of their ends a seal, and at each hub 63 on the inward side there is provided the cap 65 while on the rearward side, includes a corresponding cap 66 and both these caps at each shaft are fastened onto the hub 63 by screws 67' (see Figure 6) and they are suitably fitted to prevent axial movement of the bearing 64 therein the hub, and as the bearing in each case is anchored onto the shaft end by means of a shoulder on the shaft and a snap ring 67 provides a structure that prevents of axial movement of either of these shafts. And at each shaft the cap 66 has a cavity 68 which forms a part of the apertured system that provides for continual wetting of the bearing 64 and other actuating parts of the unit by a portion of the fluid 22, as will be hereinafter dealt with.

Figure 5:
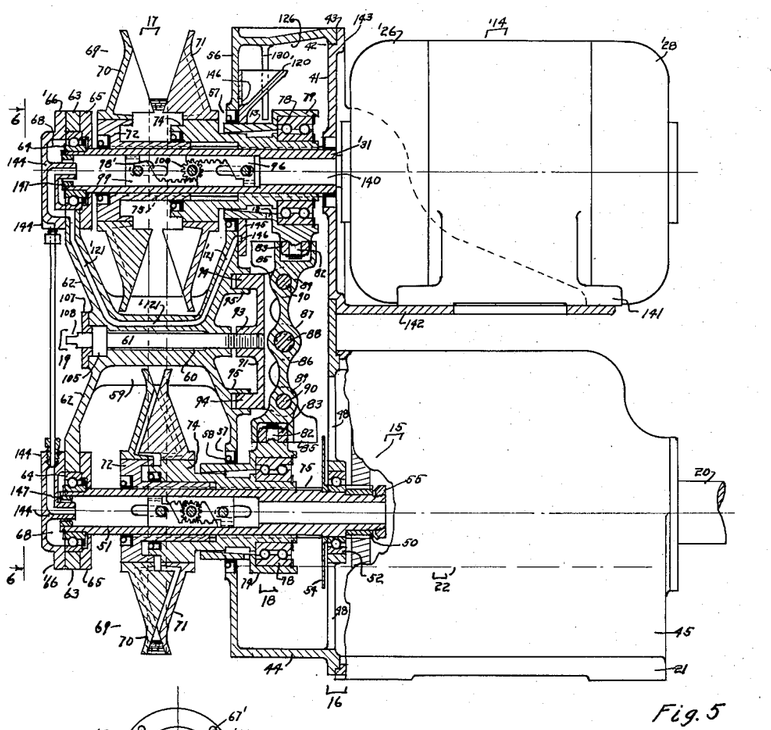
Figure 5 is a view like Figure 1 of a modified embodiment of my invention.
Figure 7:
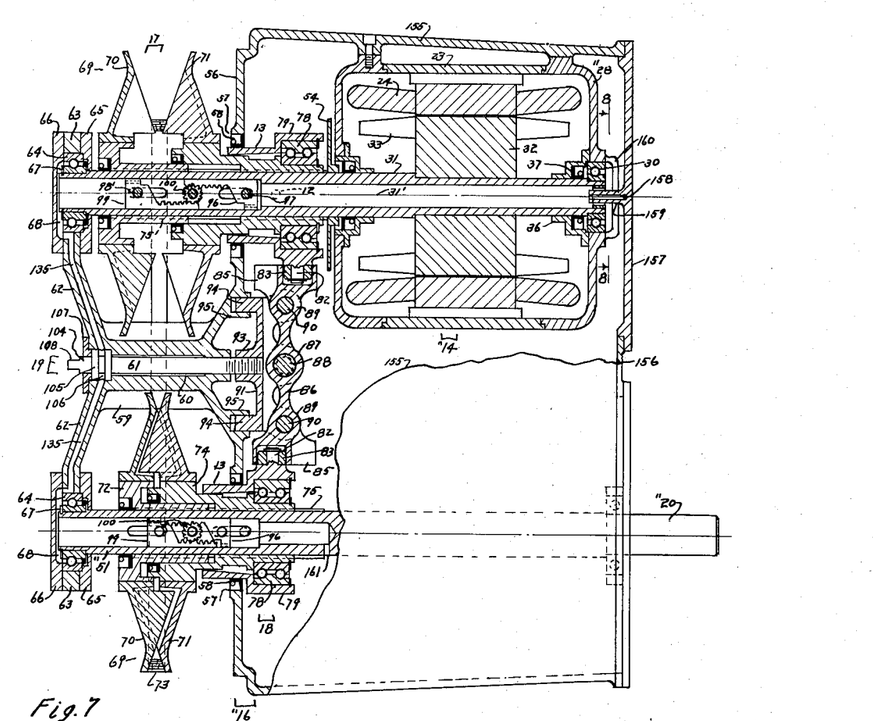
Figure 7 is a plan view partly in section of another modified embodiment of my invention.

The adjustable speed mechanism 17 of the adjustable speed transmission mechanism or unit Figures 1, 5 and 7 exclusive of the control means 18, takeup means 19 and the to be described apertured system of continual wetting of the metal to metal actuating parts are generally similar to that shown and described therein my aforementioned Patent 2,637,215 and application Serial 372,082, therefore complete detailed description is here being omitted. And referring to the Figure 1, the constant speed shaft 31 is of tubular form, and has one end journally supported by the bearing 30 and it extends through a portion of the housing 16, so that its other end is journally supported by the bearing 64. And with reference to the variable speed shaft 51 which is also of tubular form and has one end journally supported by the bearing 52 within the housing 16 and extends therefrom so as to permit of its other end being journally supported by the other bearing 64. Thusly in this illustration, there are two shafts supported for rotation in spaced parallel relationship and in between each bearing 64 and the rear side 56 of the housing 16, they each mount an adjustable effective diameter pulley structure 69. Each being formed of a pair of cooperating pulley sections 70 and 71 having opposed inclined faces, for engaging opposite sides of the endless V-belt 73. And in this instance show the application of a narrow type V belt, they are formed to telescope into one another when adjusting from the minimum effective diameter position. However when wide section V-belts are utilized in this device, the pulley half faces need not be formed to telescope, nor in either event, need both pulley structures be of similar size. The pulley sections 70 in each case, in the present instance, are suitably mounted onto their hubs 72, which in turn, mount axially slidable onto their respective shafts. And the pulley halfs 71 in each case are also suitably mounted onto their hubs 74, which in the present example, also mount axially slidable onto their respective shafts. And the drive means between the pulley half hubs and/or pulley structure and its respective shaft consists of splines 75 or keys, best seen at the Figure 2. The above described construction provides straddle mounting of the pulley structures between a pair of journals at each shaft, which provides desirable structure for the application of multi-V-belt drives, and it also provides an open end for convenient placement and/or removal of endless V-belt or belts.

Figure 2:
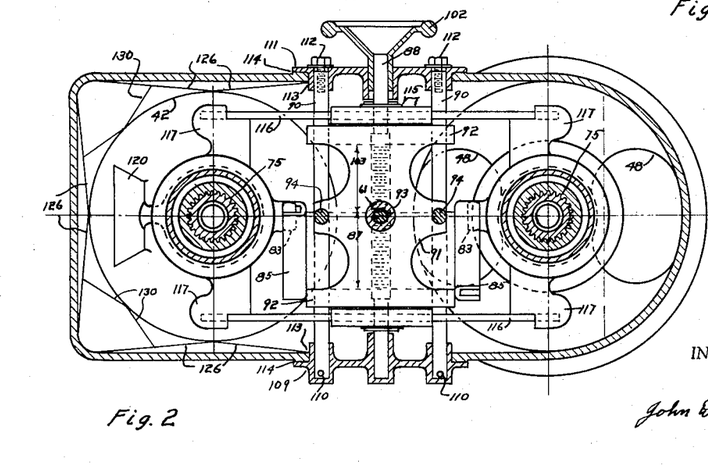
Figure 2 is a cross section view partly in section taken generally on the line 2—2 of Figure 1 but, broken to show the locking mechanism for locking in place of a takeup adjustment.

Referring to the Figures 1 and 2, the control means 18 shown is of the positive type, that is, it effects control of the axial movement of the movable pulley sections at each shaft in both directions, even were the V-belt omitted. See Figure 1 the right end of each of hubs 74 between a shoulder 76 thereon and snap ring 77, mounts a thrust bearing 78 which is disposed within an adaptor 79 between a shoulder 80 and a snap ring 81, thus forming an assembly so that together with the pulley section 71 of the pulley structures act as a single unit. And each of the adaptors 79 include a pin 82, each of which mount a roller 83 that is held in place by the snap ring 84. Each of these rollers 83 extends into the groove of the control track 85. And in the present illustration, these two control tracks 85 are formed as an integral part of the control nut 86, of which its axial length is represented by the arrowed line 87 (see Figure 2). The groove of each of the control tracks is in the form of an arc of a true circle, but disposed oppositely, so that upon the control nut being caused to move axially, moves one roller in a direction toward the center of the V-belt while simultaneously the other roller moves axially in direction away from the center of said V-belt. Intermediate the control tracks 85 the control nut 86 includes a hub 87, that internally has screw threads which is threadingly connected the control screw 88. And intermediate the hub 87 and the control tracks 85 are a pair of hubs 89, each of which is bored for a slidable fit for a guide rod 90. So that upon the control nut 86 being caused to move, its axial movement is in transverse direction relative to the axis of the shafts 31 and 51. Intermediate of the control nut 86 and the rear wall 56 of the housing 16, is a control unifying plate 91, which at each of its ends has a hub 92 that is in line with the hubs 87 and 89 of the control nut 86 and these hubs 92 in line with the control screw are suitably fitted to serve as the journals for the control screw. And in line with the guide rods they are bored to permit of same extending therethrough (best seen at the Figure 2). Then in line with the aperture 60 in the extension 59 of the housing 16, the unifying plate 91 has a hub 93 which is screw threaded for the takeup means 19, hereinafter described. And spaced on both sides of the hub 93, the unifying plate 91 has a pair of pins 94 that extend with slidable fit into a pair of bosses 95 that in turn form an integral part of the rear section 44 of the housing 16. The pair of pins 94 extending into the bosses 95, serve to center the unifying plate 91 together with that portion of the control means 18 within the housing 16. Within each of the shafts 31 and 51 is a rack 96 which is secured in each case to the hub 74 by the pin 97, which in turn, passes through the elongated opening 98 in the side walls of these shafts. Also within each of the shafts 31 and 51 is a rack 99 which is likewise in each case secured to the hub 72 by a similar pin 97′ which again in turn passes through the elongated opening 98′ in the side walls of these shafts. The racks 96 and 99 in each case are in mesh oppositely with a pinion gear 100, which is journaled within each of the shafts by the pin 101 that is in each case anchored in fixed position to the side walls of the shafts while allowing for the pinion gears 100 to rotate. Then in addition to said elongated openings 98 and 98′ allowing the pins 97 and 97′ extending through the side walls of the tubular shaft in each case, also serve as transverse opening to communicate the shaft interior therewith the drive means or splines 75 (hereinabove described) and thus form a definite part of the inclosed of continual fluid lubrication and wetting of the metal to metal actuating parts of the unit mechanically, as will be seen.

Now let it be assumed that the control means 18 has been secured in place by the takeup means 19 and its locking means hereinafter dealt with, and let it be further assumed that the adjustable speed mechanism 17 be adjusted to its opposite speed position by actuation of the handwheel 102, which due to its rigid connection therewith the control screw 88, causes movement of the control nut 86 together with the oppositely positioned control tracks 85 from the position shown (Figure 2) the distance represented by the arrowed line 103, and in so doing (see Figure 1) due to the roller 83 riding on the side of the groove of the control track 85 causes movement toward the center of the V-belt of the unit consisting of the parts 71, 74, 78, 79, 83 and rack 96 at the shaft 31, and simultaneously at this same shaft 31, due to the opposite meshing of the rack 99 therewith the pinion gear 100, which is caused to revolve by the axial movement of the rack 96 also causes axial movement toward the center of the V-belt of the unit consisting of the parts 70, 72 and the rack 99. While simultaneously at the shaft 51 the axial movement of similar unitized parts would occur in opposite direction, that is away from the center of the V-belt. And it is understood that the contour of the sides of the groove within the control tracks and their relative positions, provides the desired axial movement at each of the adjustable effective diameter pulley structures to provide condition of constant pitch path length throughout the range of speed adjustments.

The takeup means 19 and its locking device comprises the takeup stud 104 which has the enlongated shank 61 heretofore mentioned and the inward end of this shank has screw threads that form a screw threaded connection therewith the unifying plate 91 also heretofore mentioned. And the other end of the shank has an enlarged diameter portion 105 which intermediate its length includes a groove which forms a circumferential aperture 106. The enlarged portion 105 provides a pair of shoulders, one of which rests against a face of a bore at the end of the aperture 60 and the other rests against a hub of the cap 107 which in turn is fastened onto the outward end of the extension 59 of the housing 16 (the fastenings are not shown). These two abutments prevent of axial movement of the takeup stud 104, but allow for its being rotated by means of a wrench or like tool, as the outward free end of the takeup stud has flat portions, as at 108 for the application of a wrench.

See Figure 2, the locking device of the takeup means 19, consists of extensions of the guide rods 90 extending beyond the ends of the unifying plate 91. And one end of these guide rods 90 extend into portions of the flange member 109 and are anchored therein as by means of pins 110. The other ends of these guide rods 90 extend into portions of a like flange member 111, which has a pair of holes extending therethrough for reception of the ends of these guide rods, which are provided with internal screw threads, into which are screw threaded the shank of a pair of capscrews 112. Both the flange members 109 and 111 have a flange 114 that extends beyond the edges of the openings 113 in the side walls of the rear section 44 of the housing 16, so upon tightening of the capscrews 112 causes binding between the inner faces of the flanges 114 and corresponding outer faces of the side wall of the rear section 44, which locks an adjustment of the takeup means 19. The openings 113 being elongated so as to permit of the takeup means 19 adjusting the position axially of the unifying plate 91 of the control means 18. And both the flange members 109 and 111 intermediate of the guide rods 90 provide suitable fluid tight reception of the control screw 38 and in so far as the openings 113 and these flange members 109 and 111 are concerned, they are reversable so as to permit of the handwheel being located at either side of the unit.

Now let it be assumed that it is desired to alter the effective diameters of the pulley structures, to effect a change in the pitch path length for the V-belt to accommodate the pitch length of a V-belt or compensate for service wear, or provide looseness for removal or placement of the endless V-belt. First the capscrews 112 are loosened and then the takeup stud 104 is rotated by means of a wrench in a desired direction, which due to its screw threaded connection therewith the unifying plate 91 of the control means 19, causes movement of the entire control means 19 toward and/or away from the center of the V-belt which due to its unification therewith the pulley structures, produces simultaneously a like change in the same direction of the effective diameters of the adjustable effective diameter pulley structure at each shaft, that is, they both increase or they both decrease by equal amount, consequently when the takeup means 19 is applied, it does not change the angle of contact of the V-belt therewith the pulley structures in any way. Then after the desired takeup adjustment has been made, the capscews 113 are tightened, which effects as heretofore mentioned, locking of said adjustment.

In the illustrations Figures 1 and 2, have shown the application of a resilient reactance means, shown and described in my application Serial 372,082 hereinabove mentioned, therefore complete description is here being omitted. However in the present instance, it is disposed within the housing 16, which provides of its actuating parts being wetted by the fluid means 22, as will hereinafter be dealt with. The numeral 115 generally designates this reactance means, and it is combined into the control means 18, in manner to provide a thrust force in a direction opposite to that of the thrust forces produced by the wedging action of the V-belt thereon the inclined faces of the pulley structures and thence onto portions of the control means 18. And in which, throughout the range of actuation of the control means the reactance means thrust force remains substantially constant. And referring more particularly to the Figure 2, the pair of resilient rods 116, which are pivotally mounted about a portion (not shown) of the unifying plate 91, extend to a pair of lugs 117 at each adaptor 79 and in addition to providing the above mentioned thrust force, these resilient rods 116 serve to prevent rotation of these adaptors. And in the event that this reactance means be omitted, it is understood that suitable structure be provided to prevent rotation of these adaptors, yet permit of their moving in axial direction upon actuation of the control means. The left end of each adaptor 79 includes a projection 13, that extends slidable through the internal portion of the seals 58, and so form a fluid closure. Internally each projection 13 slopes toward the end of the thrust bearing 78 and in adjacency to the thrust bearing 78 are a series of holes 12 only one being shown, of which at least one of the series of holes 12 serves to drain the fluid into the interior of the housing 16 upon its flowing through the interior of the thrust bearings 78. Also at both shafts the positive seals, sealing the fluid within the apertured system hereinafter described where axial movement occurs, need compensate for only the rubbing action produced by said axial movement.

Figure 3:
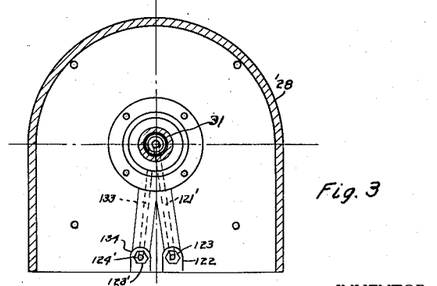
Figure 3 is a cross section taken on the line 3—3 of Figure 1.

The inclosed system of continual fluid wetting of the metal to metal actuating parts in the unit Figure 1, consists of the orifice 120, which as shown is an integral part of the end bell 26, and disposed at a level above the horizontal center 31' of the constant speed shaft 31. The top of the orifice 120 in the present instance, is open to the interior of the housing 16, and leading from the bottom of the interior of the orifice is a hole 121 which first extends downwardly then circumferentially around the outside diameter of the bearing 39 and then downwardly again to a boss 122 that is tapped for an ordinary tubing fitting 123 of the union type, which includes a section of tubing 124 that extends horizontally through one air duct 25 of the motor 14, and at the opposite end of the tubing 124 is another union type fitting 123 which is screwed into a similar boss 122 that is a part of the end bell 28 and this boss includes a hole 121' that extends upwardly to the center 31' of the shaft, whence it extends horizontally a short distance through a boss or discharge means 125, that extends into the interior of the shaft 31, thus the holes together with the tubing forms a first aperture means that is inclosed so that upon the fluid dripping continually into the orifice, same will be discharged through the opening in the boss 125 into the interior of the constant speed shaft 31, which shaft and its transverse opening 98 and 98' forms a second aperture means, as will be seen. The propulsion means 54, which in the present illustration is in the form of an ordinary slinger and it extends to the fluid 22 within the housing, so that upon operation of the unit, causes a portion of said fluid being propelled by centrifugal force above the level of the fluid pool continuously, and in so being propelled causes wetting of that portion of the control means 18 that is located within the housing 16. Also it causes a portion of the propelled fluid being continually thrown so that a portion drops into the interior of the orifice and other portion onto the interior faces of the side walls of the housing. And to assure that a portion of the propelled fluid that is thrown onto the side walls drips into the opening of the orifice 120, these side walls adjacent to the orifice are sloped toward its opening, as at 126, see Figures 1, 2 and 4. For it is well known that due to capillary forces, the flow of a fluid upon a ceiling surface follows its slope to its lowest edge, whereupon weight and gravity forces takes over and causes it to leave the lowest edge, and as the construction provides that a lowest edge occurs over the opening the fluid continually drips into the orifice, whence as hereinabove described, the first aperture means causes its being discharged into the interior of the shaft 31. And referring particularly to the Figure 4, which shows by means of solid lines an outline of the housing 16 in upright position of which the dot and dash line 127 represents the vertical center line. And the orifice 120 is indicated by means of dotted lines, as is also shown the ceiling or side wall slope 126, of which the point 128 designates the lowest edge, which occurs directly over the open end of the orifice, consequently as a portion of the propelled fluid leaves this edge 128 it drips thereinto the orifice. And as heretofore mentioned, in the present instance, the orifice 120 is an integral part of the end bell 26, which together with the motor 14 and the end bell 28 may be mounted onto the housing 16 in various relative positions due to the provision of the connection therewith as at 43. And now let it be assumed that it is desired to mount the unit in a horizontal position, that is, that the orifice 120 be disposed either to the right or the left of the vertical center line 127, as is indicated by the dash lines 129, which indicate a fragmentary portion of the housing disposed horizontally. And to compensate for such contingency the development provides that the ceiling or side wall 126 that now occurs above the orifice 120 be similarly sloped so as to produce a low edge 128 over the correspondingly adjusted position of the orifice, which in such an installation is ninety degrees from that of the upright mounting position. And to provide a sloping ceiling surface when the unit is mounted at an angle or intermediate between an upright and a horizontal position, the development provides a rib member 130, that extends from a pair of adjacent sloping surfaces 126 and in which its lowest edge occurs directly over the orifice opening. Thus it is readily seen that the developement provides a structure that readily permits of the unit being mounted in various positions while maintaining the system of continual wetting of the actuating parts, and it is understood that the propulsion means shown and described may be in the form of a gear pump or the like. And referring again to the Figure 1, within the shaft 31 about the boss 125 is a hollow plug 131, which is suitably fastened into the shaft as by welding. The hollow within the plug 131 being of larger diameter than is the outside diameter of the boss 125, which provides a space therebetween to readily permit of an excess portion of the propelled fluid that enters therein the interior of the shaft being discharged through said space and cause wetting of the bearing 30, whence it spills into the hollow 132 in the end bell 28. And from the hollow 132 the excess fluid enters a hole 133 (see Figure 3) which extends downwardly to a boss 134 that threadingly joins a tubing 124' through its union fitting 123' which extends parallel to the tubing 124 through an air duct 25 to a fitting and a boss, not shown in the wall 42 of the end bell 26, which permits of this excess fluid being returned to the interior of the housing 16.

The thickness of the wall of the hollow plug 131 forms a fluid dam within the shaft 31, in that as the fluid entering into the shaft 31, centrifugal force as well as the difference of the height between the orifice and the center of the shaft tends to spread the fluid over the entire surface of the internal diameter therein the revolving shaft, consequently that portion of the fluid that does not escape through the space between the plug 131 and the boss 125 is caused to travel from the right end of the shaft to its left end, where it spills into the cavity 68. And in spilling from the left end of the shaft 31, the fluid causes wetting of the bearing 64 at this end of this shaft, while the bearing 39 that is within the housing is wetted by the propelled fluid. However in the fluid transversing through the internal diameter of the shaft 31, causes wetting of the surface of the gear teeth of the racks and the pinion gear and the mating surfaces between same and the shaft bore, as well as the mating surfaces of the drive means or splines 75 externally on the shaft and internally on the hub members of the pulley structure, for the elongated opening 98 provide opening in the wall of the shaft so that the fluid continually reaches these mating surfaces. And upon reaching these mating surfaces of the drive means, the drive means itself provides spaces through which the fluid may travel, for particularly at the top and bottom the teeth of the splines do not touch one another. And the positive type seals provided at the hub members, prevent the fluid escaping from the system. And the above may be considered as forming a second aperture means, and in which to provide additional passage way for the fluid transversing through the shaft 31, the hub portions of the rack members may be provided with holes 134'. And of an apertured system for continual wetting of the actuating parts of the unit, the following may be termed a third aperture means, which consists of a hole 135 that extends from the cavity 68 at the end of the constant speed shaft 31, to a circumferential aperture 106 therein the enlarged diameter portion 105 of the takeup stud 104. And from the circumferential aperture 106 the hole 135 extends to a similar cavity 68 at the end of the variable speed shaft 51. As shown Figure 1, the hole 135 is disposed within the transverse arms 62 of the extension 59. And it provides a continual fluid passage from an end of the shaft 31 to a corresponding end of the shaft 51, where the fluid effects wetting of its end bearing 64. For each bearing 64, forms a side portion of this third aperture means, which extends from an end of the shaft 31 (second aperture means) to an end of the shaft 51, which latter shaft with its transverse openings 98 and 98' (not numbered Figure 1) constitutes a fourth aperture means. For from the cavity 68 at shaft 51, the fluid enters the interior of this shaft 51, and in like manner to that of the shaft 31, it causes wetting of the actuating parts within and externally on the shaft 51, whence through the hollow of this shaft which in the illustration Figure 1 terminates within the housing 16 so that the excess fluid returns to the fluid pool 22 therein the housing for continual recirculation, thus forming an unlimited source of fluid for the system.

The present apertured system hereinabove described for causing substantially a continual wetting of the actuating parts of the unit by a mechanical means, is simple, inexpensive and it has definite utility, for it eliminates entirely the need of frequent injection of a fluid at numerous points of a unit for wetting of the metal to metal actuating parts of a vairable speed transmission mechanism by manual means, as is the only method provided therein the prior art. And it is well known in the art of splines or feather keys, where axial sliding movement of the metal to metal mating parts is to occur, that clearances must be allowed to permit of this axial sliding movement. And that unless continual suitable fluid wetting of the respective sliding surfaces be provided, the respective parts will stick, seize or gall which, definitely renders a change of the effective diameter of an adjustable effective diameter pulley difficult and even impossible, whether the V-belt variable speed apparatus be of the type having its shaft spacing fixed or adjustable or whether only one pulley section or both pulley sections of a pair are movable axially to effect a speed change. Also it is well established matter that numerous failures have heretofore occurred in the field of V-belt type variable speed transmission devices, due entirely to the neglect of providing for the maintenance of continual fluid wetting of the aforementioned slidable surfaces, for as seizing and/or galling occurs, it destroys the respective slidable surfaces of the mating parts to the extent where they have to be discarded.

As hereinabove described, the propulsion means 54, Figures 1, causes a portion of the lubricant fluid 22 being propelled above the normal level of this fluid pool within the inclosure of the housing 16, so that it drips into the orifice 120. And from this orifice 120, is a first aperture means, which consists of the holes 121, 121', tubing 124 and the discharge means or boss 125. And an end of this discharge means 125, projects into the interior of the shaft 31, and as this orifice 120 is disposed at a higher level than that of the center of the shaft 31, causes the fluid from the orifice being discharged into the interior of the shaft 31. Which shaft 31 and its transverse opening 98 and 98' forms a second aperture means. And as these transverse openings extend from the interior of the tubular shaft 31 to the drive means or splines 75, consequently as said fluid flows therein the interior of this shaft, causes a lubricant wetting of the slidable surfaces of the drive means between the pulley structure 69 and its shaft. And as the dripping of the fluid into said orifice occurs in a continual manner, a portion of said propelled fluid flows into a third aperture means, which consists of the cavity 68 at the shaft 31, hole 135 in the arms 62, groove 106 about the head of the takeup 19 and into the cavity 68 at the shaft 51. In this example, an end of the bearing 64 at each of these shafts forms a side portion of this third aperture means, consequently as said fluid flows within, same causes a fluid wetting of the actuating parts of said bearing 64 at each shaft. And from the cavity 68 at the shaft 51, said fluid is free to flow into the interior of the shaft 51. So that the shaft 51 with its transverse opening (not numbered but corresponding to 98 and 98' therein the shaft 31) forms the fourth aperture means, which includes the transverse openings extending from the interior of this tubular shaft 51 to the drive means or splines 75, consequently as the fluid flows therein the interior of this shaft, causes a lubrication wetting of the slidable surfaces of the drive means between the pulley structure 69 and its shaft 51. And as this fourth aperture means terminates within the inclosure, the excess fluid is free to return to the fluid pool. For the orifice together with the first to fourth aperture means are in series, so as to provide substantially a continual fluid tight aperture system, in which this system and the propulsion means forms the major mechanical means for causing substantially a continual wetting of the metal to metal actuating parts of the mechanism, from the fluid pool or reservoir within the housing throughout a corresponding activation of the drive motor in a mechanical manner. And wherein the system being continual provides method for causing the excess fluid being returned to said reservoir or fluid pool for recirculation. Even tho, the opposed inclined belt engaging faces of the pulley structures 69 and the belt 73 are disposed axially beyond the fluid inclosure part of the housing 16, for the invention provides that an end portion of the drive means 75 extends into said inclosure, while its other portion extends outwardly from said inclosure, to and beyond the belt to a seal member, that is shown mounted within the outward end of the pulley structure 69. Also said mechanical means causes a similar continual wetting of that portion of the control means that is disposed therein said fluid inclosure.

Then as the present invention provides of the inclusion of a hollow plug 131, Figure 1, and 147, Figure 5, within a tubular shaft so as to form a dam (as described) which readily provides the feature wherein the fluid be delivered thereinto an end of the shaft and cause wetting of the actuating surfaces of the mechanism and also cause the excess fluid being discharged therefrom the same end for return to the fluid pool as desired. Therefore, the present development may be incorporated into a variable speed unit of the type wherein only one of its pulley structures be of the adjustable effective diameter type. And without impairing the above mentioned features of a continual lubrication of the metal to metal actuating portions of the unit by a mechanical means, as the multiplicity of apertures can readily be modified accordingly.

With reference to the Figure 5, which is a view like the Figure 1 of a modified embodiment of my invention. And throughout where parts are similar to those therein the unit Figure 1, have applied the same numerals and where a part differs somewhat, used the same numeral, but with the prefix '. This unit Figure 5 shows an application of a standard motor '14 which includes the end bells '26 and '28, that in turn supportably mount journals (not shown) for the motor output shaft 140, also the motor '14 includes the mounting feet 141. These motor feet, suitably connect and are fastened onto a shelf 142 of a flanged bracket 143, which forms the support for the motor, by its end wall 41 being suitably fitted fluid tight into the opening 42 of the housing 16, as at 43 and fastened thereto, however these fastenings are not shown, nor are the fastenings at the motor feet. And in the present instance, Figure 5, the housing 16 is same as that hereinabove described, with the exception of the fastening thereto in adjustable manner, the orifice '120, hereinafter described. Therefore as the housing 16, its fitting, speed change gearing 15, fluid pool 22, variable speed shaft 51, propulsion means 54, control means 18, takeup means 19 and the adjustable speed mechanism 17 are same as those heretofore described, their descriptions are not here repeated.

The caps '66, Figure 5 are similar to the caps 66 Figure 1 in that they provide a cavity 68 at the rear end of each shaft '31 and 51, however they are modified by the inclusion of the bosses 144 hereinafter described. And the constant speed shaft '31 is of tubular form and has a bore and is fitted to suitably mount onto the output shaft of the motor '14, so that it together with the output shaft 140 rotate in unity, and it extends through a portion of the housing 16, so that its other end is journally supported by the bearing 64.

The inclosed system of continual fluid wetting of the metal to metal actuating parts of the unit Figure 5, consists of the orifice '120, which as shown mounts onto the rear wall 56 of the rear section 44 of the housing 16. This orifice '120 includes a ring flange 145 that is suitably fastened as by screws (not shown) in a desired adjusted position that corresponds with the mounting of the unit. The flange 145 includes a circular groove 146 which connects with the interior portion of the orifice and to coincide with the circular groove 146 is a hole '121 that in the present example, is located within a portion of the extension 59 and one of its transverse arms 62 of the housing 16, so that it extends from said circular groove 146 to a hole within the boss or discharge means 144, that in turn extends transversely and axially so that an open end of the boss extends into the interior of the constant speed shaft '31. Thus the hole '121 and the hole in the boss together with the circular groove 146 forms a first aperture means that is inclosed so that upon a fluid entering continuously into the orifice, same will discharge through the open end of the boss into the interior of the constant speed shaft '31 that with its transverse opening 98' forms a second aperture means. And as heretofore described, the propulsion means 54, extends into the fluid within the housing, so that upon operation of the unit, causes a portion of said fluid being continuously propelled by centrifugal force above the level of the fluid pool, and in so being propelled causes wetting of that portion of the control means 18 that is disposed within the housing 16. Also it causes portion of the propelled fluid being continuously thrown into said orifice and onto the interior faces of the side walls of the housing, and again to assure that portion of the propelled fluid drips into the opening of the orifice '120, these side walls adjacent to the orifice are sloped toward its opening, as at 126, see Figures 5 and 4. For as heretofore stated, it is well known that due to capillary forces, the flow of a fluid upon a ceiling surface follows its slope to its lowest edge, whereupon weight and gravity forces takes over and cause it to leave the lowest edge, and as the construction Figure 5 provides that a lowest edge occurs over the opening, the fluid continuously drips into the orifice, whence as heretofore described, the first aperture means causes its being discharged into the interior of the shaft '31 at its left end. And the description with reference to the Figure 4, may also be read, with reference to the unit Figure 5 in so far as concerns various mountings and their relationship to the adjustability of the orifice '120 and corresponding slopings of the interior surfaces adjacent thereto.

Again referring to the Figure 5, within the left end of the shaft '31 about the boss 144 that extends into this shaft, is a hollow plug 147, which is suitably fastened into the shaft, as by welding. The hollow within the plug 147 is of larger diameter than is the outside diameter of this portion of the boss 144, which provides a space therebetween that readily permits of an excess portion of the propelled fluid that enters therein being discharged therefrom and cause wetting of this bearing 64, whence it flows into the cavity 68, which is joined by the hole 148 that extends transversely toward the variable speed shaft 51, see Figure 6. And the other end of the hole 148 is tapped for connecting thereto the tubing 149, by means of a union type fitting, this tubing 149 extends transversely to the boss 144 in the cap "66 at a corresponding end of the variable speed shaft 51. And this boss 144 has a hole 150 that extends transversely and axially (also see Figure 5) and so provide an open end of the boss within the interior of the shaft 51, so as to provide third aperture means that extends transversely between the constant speed shaft '31 and the variable speed shaft 51, that readily causes of continual flow of the excess fluid into the latter shaft. The connection of the tubing 149 therewith the hole 150 is also by means of a union type tubing fitting which screw threads into a tapped portion of the hole 150. And this end of the shaft 51 also has a hollow plug 147 that is similar to that above mentioned and described so that a portion of the fluid therein the shaft 51 flows to effect wetting of the bearing 64 at this end of the shaft 51. The thickness of the wall of the hollow plug 147 forms a fluid dam within the shaft '31 in that as the fluid entering into this shaft, centrifugal force as well as the difference of the height between the orifice and the center of the shafts tends to spread the fluid over the entire surface area of the internal diameter therein the revolving shaft, which causes the fluid wetting the surfaces of the gear teeth of the racks and the pinion gear and the mating surfaces between same and the shaft bore as well as the mating surfaces of the drive means or splines 75 externally on this shaft and internally on the hub members of the pulley structure, for as heretofore mentioned the elongated opening 98 provides ample opening in the wall of the shaft so that the fluid continually reaches these mating surfaces. Also as heretofore mentioned the fluid reaching these mating surfaces of the drive means, the drive means itself provides spaces through which the fluid may circulate. In the unit Figure 5 its constant speed shaft being of tubular form and, its mounting thereon the output shaft of the motor closes one of its ends, consequently the thickness of the fluid therein can never exceed the thickness of the walls of the hollow plug 147 and as the apertured system provides for continual flow of the fluid from the fluid pool within the housing 16, the excess must discharge therefrom this shaft through the space between the inside diameter of the hollow plug and the outside diameter of the boss 144, which assures of an excess portion flowing through the third aperture means to the interior of the variable speed shaft, which may be termed as providing a fourth aperture means as it provides an aperture means whereby the excess fluid return to the fluid pool or reservoir within the housing 16 so that it can be continually recirculated. And in the fluid transversing through the variable speed shaft 51 as heretofore mentioned and described it causes fluid wetting of various metal to metal actuating parts of the unit. And the unit Figure 5, serves to illustrate that the present development concerning the continual system of aperture means for continually causing the fluid from a reservoir wetting of the metal to metal actuating parts of a V-belt variable speed mechanism by mechanical means, may readily be incorporated into variable speed devices of the type disclosed by my Patent 2,573,493, dated October 30, 1951, wherein only one of the pulley structures of a cooperating pair connected by its V-belt possesses feature of varying its effective diameter, for the illustration shows that it is not necessary that both ends of the shaft mounting the adjustable effective diameter pulley structure be open at both of its ends to permit of continual circulation of the fluid therethrough.

The Figure 7 is a top plan view partly in section of another modified embodiment of my invention. And again throughout, where parts are similar to those in the Figure 1, I have applied the same numerals, and where a part differs somewhat, I use the same numeral, but with the prefix ". This unit Figure 7 shows an application of a regular motor "14 having desired electrical characteristics, however its frame structure is fluid tight and it is operably mounted within the fluid tight housing "16 in similar manner as has been disclosed and described therein my application Serial 483,275, filed January 21, 1955, Patent No. 2,794,930, so as to permit of the very same fluid that is caused to circulate continually through its system of effecting continual wetting of the actuating parts of the V-belt variable speed transmission mechanism to continually wet the exterior surfaces of the motor as had been fully described therein the above mentioned application, therefore further description concerning same is generally here omitted.

Figure 8:
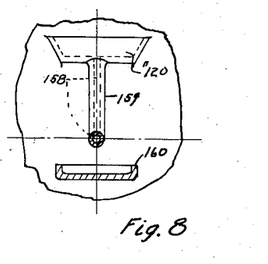
Figure 8 is a fragmentary view in section taken on the line 8—8 of Figure 7.

The housing "16 as heretofore, confines a fluid means 22, however as this Figure 7 constitutes a plan view, same is not indicated, and the rear end wall 56 of the housing "16 at each shaft includes the concentric openings 57 into which are suitably fitted the positive seals 58, and intermediate of these openings 57, the rear wall includes the extension 59, which including its transverse arms 62 and its fittings are same as had been described, therefore further description is here omitted. The side walls 155 extending from the rear wall 56 to the front wall 156, are sloped toward said front wall, so that as heretofore dwelt with, operably the propulsion means 54 causes the fluid being thrown therefrom whereby a portion of the propelled fluid is thrown onto these side walls, whereupon due to the sloped surfaces it flows horizontally toward the front wall then downwardly into the open top of the orifice "120, best seen at the Figure 8. This orifice "120 being in the present instance, an intergal part of the front closure plate 157, which is suitably fitted and fastened onto the front wall 156 of the housing "16. And joining the interior of the orifice "120, is a hole 158 that extends vertically and horizontally through the boss 159, which in turn has open end extending into the interior of the constant speed shaft, so that a portion of the propelled fluid that enters into the orifice discharges thereinto the shaft 31, whence this fluid is caused to transverse the interior of the shaft 31 and cause wetting of similar surfaces as had been heretofore described. And the right end of this shaft 31, also includes a hollow plug 131 and its purpose is also as had been described, however see Figure 8, have shown the inclusion of a trough member 160, which in the present instance, is an intergal part of the end bell "28 and its top edge is of a height to assure of wetting of the bearing 30 and thence the excess fluid overflows this edge and returns to the fluid pool or reservoir within the housing "16 for continual recirculation.

The aperture means extending from the shaft 31 to the shaft "51 is same as that described, concerning the unit Figure 1. And this variable speed shaft "51 is shown as extending beyond the front end wall of the housing and so forms the power takeoff shaft of the unit Figure 7. However the opening within this shaft only extends part way into the housing and to permit of the excess fluid returning to the fluid pool within the housing "16 includes a hole 161 at the end of the opening within the shaft "51. And as this shaft revolves at considerable speed, contrifugal force also causes further wetting of the surfaces of the mechanism therein, such as the control means 18 and the external surfaces of the motor frame. For drawing clarity, I have intentionally omitted indicating the inclusion of the reactance means 115 therein the Figures 5 and 7.

Thus in each instance, the present developement provides an inclosed system of continual fluid wetting of the metal to metal actuating parts of a V-belt type variable speed transmission mechanism mechanically, in which its fluid reservoir provides unlimited source of fluid, whereby eliminating entirely the necessity of manual performance of fluid wetting of the actuating parts at very frequent intervals, as is the case, therein the prior art. Actually the developement provides, a self-contained automatic inclosed system for effecting continual fluid wetting of its metal to metal actuating parts and wherein the fluid medium does not require renewal at frequent intervals.

I claim:

1. In a variable ratio transmission mechanism, having a housing, said housing providing a fluid tight inclosure and having an operable mounting means for a drive motor, a first and a second shaft extending from within said inclosure in spaced parallel relationship, variable effective diameter pulleys mounted in opposed cooperative positions on said shafts, each of said pulleys comprising a pair of sections having opposed inclined belt engaging faces, forming by relative axial adjustment variable effective diameters, for an endless V-belt in active driving relationship to said pulleys, said faces and said belt being disposed externally beyond said inclosure, drive means engaging said pulleys and said shafts so that each shaft rotates uniformly therewith its respective pulley, an end portion of said drive means extending into said inclosure, control means for mechanically varying said ratio, a portion of said control means being disposed within said inclosure with linkage means attached thereto while extending between said control means and said pulleys, a fluid within said inclosure, a fluid propulsion means mounted within said inclosure operably connected to at least one of the shafts, said propulsion means extending to said fluid so that upon operation of said mechanism it causes part of said fluid being propelled above the normal level of the fluid pool within the inclosure to an adjustable orifice, said orifice being disposed above the center of at least one of said shafts and being adjustable angularly so as to permit of its compensating for various mounting positions of said mechanism, a first aperture means, said first aperture means extending from said orifice to and into an end of said first shaft and to, a second aperture means, said second aperture means being disposed within said first shaft and extending axially thereinto, a third aperture means, said third aperture means extending from an end of said first shaft to an end of said second shaft and, a fourth aperture means, said fourth aperture means being disposed within said second shaft and extending axially therein and terminating within said inclosure of the housing, said second and fourth aperture means having transverse opening extending to said drive means, said first to fourth aperture means including said orifice being in series and providing substantially a continual fluid tight aperture system extending from said orifice to and beyond said drive means and return to said inclosure, in which said system and said propulsion means forming a major mechanical means causing substantially a continual wetting of the slidable mating surfaces of said drive means and said portion of the control means by part of said fluid upon a corresponding operation of said motor, and whereby said system being continual providing a means for causing the excess fluid returning to said pool.

2. In a variable speed transmission mechanism, having mechanical means for causing a lubricant wetting of metal to metal actuating parts of said mechanism, said mechanical means comprising an orifice, a first aperture means having a discharge means, a second aperture means formed of a tubular shaft member having transverse opening extending through its walls to said actuating parts, and a propulsion means, wherein said orifice being disposed above the center of said member with said first aperture means extending therefrom and having its discharge means extending into an end of said second aperture means and forming, substantially a continual aperture system extending from said orifice to and beyond said transverse opening so that upon a lubricant fluid being caused to enter into said orifice, causes said actuating parts being wetted by said fluid, said member being operably supported by a housing and operably mounting said propulsion means within a lubricant fluid inclosure, said inclosure constituting a portion of said housing, said fluid being disposed within said inclosure with said propulsion means extending thereinto, so that upon operation of said member causes part of said fluid being propelled above the normal level of the fluid pool within said inclosure thereto said orifice in substantially a continual form mechanically, and said member mounting a variable effective diameter pulley structure, formed of a pair of sections having opposed inclined V-belt engaging faces, forming by axial adjustment variable effective diameter for said V-belt, said actuating parts forming the drive means engaging said structure and said member and thereby cause relative uniform rotation to one another, and said drive means extending beyond said opening with an end portion projecting into said inclosure with said faces disposed externally beyond said inclosure, said opening being disposed intermediate an axial length of said drive means, and said discharge means having an external diameter less than that of the internal diameter of said end of the second aperture means.

3. In a variable ratio transmission mechanism, having a housing, said housing providing a fluid closure and including operable mounting means for a motor and a pair of shafts in spaced parallel relationship, variable effective diameter pulleys mounted in opposed cooperative positions on said shafts, each of said pulleys comprising a pair of sections having opposed inclined belt engaging faces, forming by relative axial adjustment variable effective diameters, for an endless V-belt in active driving relationship to said pulleys, drive means engaging said pulleys and said shafts so that each shaft rotates uniformly therewith its respective pulley, control means for mechanically varying said ratio, a portion of said control means being disposed within said closure with linkage means attached thereto while extending between said control means and said pulleys, a fluid within said closure, a fluid propulsion means mounted within said closure operably connected to at least one of said shafts, said propulsion means extending to said fluid so that upon operation of said mechanism it causes part of said fluid being propelled above the normal level of the fluid pool within the closure and thereby causing wetting of surfaces of said portion of the control means by a portion of said propelled fluid, said housing having an extension that extends cantilever fashion longitudinally intermediate of said shafts, and the outward end of said extension beyond the ends of said pulleys extending transversely toward said shafts and providing for said mounting means a support for an end journal for each of said shafts.

4. In a variable ratio transmission mechanism, having a housing, said housing providing a fluid inclosure and including operable mounting means for a motor and a pair of shafts in spaced parallel relationship, variable effective diameter pulleys mounted in opposed cooperative positions on said shafts, each of said pulleys comprising a pair of sections having opposed inclined belt engaging faces, forming by relative axial adjustment variable effective diameters, for an endless V-belt in active driving relationship to said pulleys, drive means engaging said pulleys and said shafts so that each shaft rotates uniformly therewith its respective pulley, control means for mechanically varying said ratio, a portion of said control means being disposed within said inclosure with linkage means attached thereto while extending between said control means and said pulleys, a fluid within said inclosure, a fluid propulsion means mounted within said inclosure operably connected to at least one of the shafts, said propulsion means extending to said fluid so that upon operation of said mechanism it causes part of said fluid being propelled above the normal level of the fluid pool within the housing and thereby causing wetting of surfaces of said portion of the control means by said fluid, said housing having an extension that extends cantilever fashion longitudinally intermediate of said shafts, the outward end of said extension beyond the ends of said pulleys extending transversely toward said shafts so as to provide for said mounting means a support for an end journal for each of said shafts, an aperture within said extension, said aperture extending longitudinally from the interior of said housing to said outward end, a takeup stud mounted within said aperture, the inward end of said stud being screw threadingly connected to a portion of said control means while its opposite end extends beyond said outward end.

5. In a variable ratio transmission mechanism, having a housing, said housing providing a fluid inclosure and having an operable mounting means for a drive motor and a control means, a first shaft and a second shaft operably mounted in spaced parallel relationship, pulleys mounted in opposed cooperative relationship on said shafts, at least one of said pulleys comprising a pair of sections having opposed inclined belt engaging faces mounted on said first shaft and, forming by relative axial adjustment variable effective diameter, for an endless V-belt in active driving relationship to said pulleys, said faces and said belt being disposed externally beyond said inclosure, drive means engaging said pulley and the first shaft so that it rotates uniformly therewith said pulley, an end portion of said drive means extending into said inclosure, said control means providing mechanical control for varying said ratio, a fluid within said inclosure, a fluid propulsion means mounted within said inclosure operably connected to said first shaft, said propulsion means extending to said fluid so that upon operation of said mechanism causes part of said fluid being propelled above the normal level of the fluid pool within the inclosure to an orifice, said orifice being disposed within said inclosure above the center of at least one of the shafts, a first aperture means having a discharge means, said first aperture means extending from said orifice with said discharge means projecting into on end of said first shaft beyond an inner end of a plug, said plug being attached within said end, and having an internal diameter greater than the external diameter of said discharge means, a second aperture means, said second aperture means being disposed within said first shaft and extending axially therein, with transverse opening extending to said drive means, so as to cause a portion of said propelled fluid transversing therethrough and cause wetting of the slidable mating surfaces of said drive means by said fluid, and the diameter of said second aperture means therein said first shaft beyond said inner end being of greater size than that of said internal diameter, so that said plug forms a dam, and in which the difference between said external diameter and said internal diameter providing a space, so that the excess fluid overflows said dam for return to said fluid pool.

6. The invention according to claim 5, wherein intermediate said drive means and said faces said pair of sections having telescopic hub portions, in which axially outwardly beyond said end portion of the drive means that extends into the inclosure one of said sections mounting a seal member, and so forming substantially a fluid tight slideable closure means for said telescopic hub portions and the transverse opening of said second aperture means.

7. In a variable ratio transmission mechanism, having a housing, said housing providing a fluid tight inclosure and including operable mounting means for a motor and a first shaft and a second shaft in spaced parallel relationship, variable effective diameter pulleys mounted in opposed cooperative positions on said shafts, each of said pulleys comprising a pair of sections having opposed inclined belt engaging faces, forming by relative axial adjustment variable effective diameters, for an endless V-belt in active driving relationship to said pulleys, said faces and said belt being disposed externally beyond said fluid inclosure, drive means engaging said pulleys and said shafts so that each shaft rotates uniformly therewith its respective pulley, and an end portion of said drive means extending into said inclosure, control means for mechanically varying said ratio, a portion of said control means being disposed within said inclosure with linkage means attached thereto while extending between said control means and said pulleys, a fluid within said inclosure, a fluid propulsion means mounted on at least one of said shafts within said inclosure, said propulsion means extending to said fluid so that upon operation of said mechanism causes part of said fluid being propelled above the normal level of the fluid pool within the inclosure and thereby causing continual wetting of surfaces of said portion of said control means by said fluid.

8. In a variable ratio transmission mechanism, having a housing, said housing providing a fluid inclosure and including operable mounting means for a speed change gearing and a drive motor, a pair of shafts extending from within said inclosure in spaced parallel relationship, variable effective diameter pulleys mounted in opposed cooperative positions on said shafts, each of said pulleys comprising a pair of sections having opposed inclined belt engaging faces, forming by relative axial adjustment variable effective diameters, for an endless V-belt in active driving relationship to said pulleys, drive means engaging said pulleys and said shafts so that each shaft rotates uniformly therewith its respective pulley, and an end portion of said drive means extending into said inclosure, control means for mechanically varying said ratio, a portion of said control means being disposed within said inclosure with linkage means attached thereto while extending between said control means and said pulleys, a fluid within said inclosure, a fluid propulsion means mounted on at least one of the shafts within said inclosure, said propulsion means extending to said fluid so that upon operation of said mechanism causes part of said fluid being propelled above the normal level of the fluid pool within the inclosure and thereby cause continual wetting of surfaces of said portion of the control means by said fluid and said gearing being disposed so as to cause its being wetted by said fluid.

9. In a variable ratio transmission mechanism, having a housing, said housing providing a fluid tight inclosure and having an operable mounting means for a speed change gearing and a drive motor, a first and a second shaft extending from within said inclosure in spaced parallel relationship, variable effective diameter pulleys mounted in opposed cooperative positions on said shafts, each of said pulleys comprising a pair of sections having opposed inclined belt engaging faces, forming by relative axial adjustment variable effective diameters, for an endless V-belt in active driving relationship to said pulleys, said faces and said belt being disposed externally beyond said inclosure, drive means engaging said pulleys and said shafts so that each shaft rotates uniformly therewith its respective pulley, and an end portion of said drive means extending into said inclosure, control means for mechanically varying said ratio, a portion of said control means being disposed within said inclosure with linkage means attached thereto while extending between said control means and said pulleys, a fluid within said housing, a fluid propulsion means mounted within said inclosure operably connected to at least one of the shafts, said propulsion means extending to said fluid so that upon operation of said mechanism it causes part of said fluid being propelled above the normal level of the fluid pool within the inclosuure into an adjustable orifice, said orifice being disposed above the center of at least one of said shafts, a first aperture means, said first aperture means extending from said orifice to and into an end of said first shaft and to, a second aperture means, said second aperture means being disposed within said first shaft and extending axially thereinto, a third aperture means, said third aperture means extending from an end of said first shaft to an end of said second shaft and, a fourth aperture means, said fourth aperture means being disposed within said second shaft and extending axially therein and terminating within said inclosure of the housing, said second and fourth aperture means having transverse opening extending to said drive means, said first to fourth aperture means including said orifice being in series and providing substantially a continual fluid tight aperture system extending from said orifice to and beyond said drive means and return to said inclosure, in which said system and said propulsion means forming a major mechanical means causing substantially a continual wetting of the mating surfaces of said drive means and said portion of the control means by a part of said fluid upon a corresponding operation of said motor, and whereby said system being continual providing means for causing the excess fluid returning to said pool, and said pool extending to said speed change gearing.

10. In a variable ratio transmission mechanism, having a housing, said housing providing a fluid inclosure and having an operable mounting means for a drive motor and a control means, a first and a second shaft extending from within said inclosure in spaced parallel relationship, variable effective diameter pulleys mounted in opposed cooperative positions on said shafts, each of said pulleys comprising a pair of sections having opposed inclined belt engaging faces forming by relative axial adjustment variable effective diameters, for an endless V-belt in active driving relationship to said pulleys, said faces and said belt being disposed externally beyond said inclosure, drive means engaging said pulleys and said shafts so that each shaft rotates uniformly therewith its respective pulley, and an end portion of said drive means extending into said inclosure, said control means providing mechanical control for varying said ratio, a fluid lubricant within said inclosure, a fluid propulsion means mounted within said inclosure operably connected to at least one of the shafts, said propulsion means extending to said fluid so that upon operation of said mechanism it causes part of said fluid being propelled above the normal level of the fluid pool within the inclosure to an adjustable orifice, said orifice being disposed above the center of at least one of said shafts and being adjustable so as to permit of its compensating for various mounting positions of said mechanism, said housing having an extension that extends cantilever fashion longitudinally intermediate of said shafts, while its outward end beyond the ends of said pulleys extends transversely toward said shafts and so provides support means for an end journal for each of said shafts, a first aperture means having a discharge means, said first aperture means extending from said orifice with said discharge means projecting into an end of said first shaft and to, a second aperture means, said second aperture means being disposed within said first shaft and extending axially thereinto, a third aperture means, said third aperture means extending from an end of said first shaft to an end of said second shaft and to, a fourth aperture means, said fourth aperture means being disposed within said second shaft and extending axially therein and terminating within said inclosure of the housing, said second and fourth aperture means having transverse opening extending to said drive means, and wherein an end of each said end journal being disposed and forming a portion of a side of said third aperture means, said first to fourth aperture means including said orifice being in series and providing substantially a continual fluid tight aperture system extending from said orifice to and beyond said drive means and return to said inclosure, in which said system and said propulsion means forming a major mechanical means causing substantially a continual wetting of the slidable mating surfaces of said drive means and each said end journal by a portion of said fluid upon a corresponding activation of said motor, and wherein said system being continual providing a means for causing the excess fluid returning to said fluid pool for recirculation.

11. In a variable speed transmission mechanism, having a housing, said housing providing a fluid lubricant inclosure and having an operable mounting means for a motor and a control means, a pair of spaced parallel mounted shafts, pulleys mounted in opposed cooperative relationship on said shafts, at least one of said pulleys comprising a pair of sections having opposed inclined V-belt engaging faces, forming by relative axial adjustment variable effective diameters, for an endless V-belt in active driving relationship to said pulleys, said faces and said belt being disposed externally beyond said inclosure, drive means engaging said pulleys and their respective shafts and thereby causing uniform rotation between said sections and the shaft of said pair of shafts mounting said sections, which shafts being tubular and having transverse openings extending through its walls to said drive means in adjacency to said sections, and an end portion of said drive means extending into said inclosure, said control means providing mechanical control for varying said speed, a fluid lubricant within said inclosure, a fluid propulsion means mounted within said inclosure operably connected to the tubular shaft mounting said pulley comprised of said sections, said propulsion means extending to said fluid so that upon operation of said mechanism it causes part of said fluid being propelled above the normal level of the fluid within the inclosure to an orifice, said orifice being disposed above the center of at least one of the shafts, an apertured means having a discharge means, said apertured means extending from said orifice with said discharge means projecting into an end of said tubular shaft beyond an inner end of a plug, said plug being attached within said end, and having an internal diameter larger than the external diameter of said discharge means, and the inner diameter of said tubular shaft beyond said inner end of said plug being of larger diameter than that of said internal diameter so that said plug forms a dam, beyond which as the fluid spills from said discharge means said dam causes the fluid to flow toward and through said transverse opening and effect wetting of the slidable surfaces of said drive means by said fluid, and in which the difference between said external and internal diameters providing a space, through which the excess fluid overflows said dam for return to said fluid pool, and wherein said drive means extends axially from said end portion to a seal, said seal being disposed and attached within an outer end part of one of said pulleys, said propulsion means and said orifice with said aperture means forming a major mechanical means for causing substantially a continual fluid wetting for said drive means upon a corresponding activation of said motor.

12. In a variable ratio transmission mechanism, having a housing, said housing providing a fluid inclosure and having an operable mounting means for a drive shaft and a control means, a first and a second shaft extending from within said inclosure in spaced parallel relationship, variable effective diameter pulleys mounted in opposed cooperative positions on said shafts, each of said pulleys comprising a pair of sections having opposed inclined belt engaging faces, forming by relative axial adjustment variable effective diameters, for an endless V-belt in active driving relationship to said pulleys, said faces and said belt being disposed externally beyond said inclosure, drive means engaging said pulleys and said shafts so that each shaft rotates uniformly therewith its respective pulley, and end portion of said drive means extending into said inclosure, said control means providing mechanical control for varying said ratio, a fluid within said inclosure, a fluid propulsion means mounted within the inclosure operably connected to at least one of the shafts, said propulsion means extending to said fluid so that upon operation of said mechanism it causes part of said fluid being propelled above the normal level of the fluid pool within the inclosure to an adjustable orifice, said orifice being disposed within said inclosure above the center of at least one of said shafts and being adjustable angularly so as to permit of its compensating for various mounting positions of said mechanism, said housing having an extension that extends cantilever fashion longitudinally intermediate of said shafts, while its outward end beyond the ends of said pulleys extends transversely toward said shafts and so provides support means for an end journal for each said shaft, a first aperture means, said first aperture means extending from said orifice to and into an end of said first shaft and to, a second aperture means, said second aperture means being disposed within said first shaft and extending axially thereinto, a third aperture means, said third aperture means extending from an end of said first shaft to an end of said second shaft and, a fourth aperture means, said fourth aperture means being disposed within said second shaft and extending axially therein and terminating within said inclosure of the housing, said second and fourth aperture means having transverse opening extending to said drive means, said first to fourth aperture means including said orifice being in series and providing substantially a continual fluid tight aperture system extending from said orifice to and beyond said drive means and return to said inclosure, in which said system and said propulsion means forming a major mechanical means causing substantially a continual wetting of the slidable mating surfaces of said drive means by portion of said fluid upon a corresponding operation of said mechanism.

13. In a variable ratio transmission mechanism, having a housing, said housing providing a fluid inclosure and having an operable mounting means for a driving motor and a control means, a first and a second shaft operably mounted in spaced parallel relationship, variable effective diameter pulleys mounted in opposed cooperative positions on said shafts, each of said pulleys comprising a pair of sections having opposed inclined belt engaging faces, forming by relative axial adjustment variable effective diameters, for an endless V-belt in active driving relationship to said pulleys, said faces and said belt being disposed externally beyond said inclosure, drive means engaging said pulleys and said shafts so that each shaft rotates uniformly therewith its respective pulley, an end portion of said drive means extending into said inclosure, said control means providing mechanical control for varying said ratio, a fluid within said inclosure, a fluid propulsion means mounted within the housing operably connected to at least one of the shafts, said propulsion means extending to said fluid so that upon operation of said mechanism it causes part of said fluid being propelled above the normal level of the fluid pool within the inclosure to an orifice, said orifice being disposed above the center of at least one of the shafts, said housing having an extension that extends cantilever fashion longitudinally intermediate of said shafts, while its outward end beyond the ends of said pulleys extends transversely toward said shaft and so provide support means for an end journal for each of said shafts, a first aperture means having a discharge means, said first aperture means extending from said orifice with said discharge means projecting into an end of said first shaft and to, a second aperture means, said second aperture means being disposed within said first shaft and extending axially therein to, a third aperture means, said third aperture means extending from an end of said first shaft to an end of said second shaft and, a fourth aperture means, said fourth aperture means being disposed within said second shaft and extending axially therein and terminating within said inclosure of the housing, said second and fourth aperture means having transverse opening extending to said drive means, said first to fourth aperture means including said orifice being in series and providing substantially a continual fluid tight aperture system extending from said orifice to and beyond said drive means and return to said inclosure, in which said system and said propulsion means forming a major mechanical means causing substantially a continual wetting of the slidable mating surfaces of said drive means by portion of said fluid upon a corresponding operation of said motor, and in which a piece of said system extends outwardly beyond said belt, and wherein said piece being disposed within the confines of the inner perimeter of said endless V-belt, so that it be extendable over said piece without having to dismantle said system.

14. The invention according to claim 13, wherein said pulleys being disposed intermediate said inclosure and said outward end, and in which said extension with its outward end being disposed within the confines of the inner perimeter of said endless V-belt, so that it be extendable thereover said outward end.

15. The invention according to claim 1, wherein said inclosure having a series of inner surfaces disposed to correspond to said various mounting positions and provide surfaces that slope toward said orifice, and so provide a ceiling surface to cause a part of said propelled fluid dripping thereinto said orifice.

16. The invention according to claim 1, wherein said motor being disposed within said inclosure, and having its lower portion extending into said fluid.

17. In a variable speed transmission mechanism, having a housing, said housing providing a fluid lubricant inclosure and having an operable mounting means for a control means, a pair of parallel mounted shafts, pulleys mounted in opposed cooperative positions on said shafts, at least one of said shafts having an extension extending from within said inclosure, and said extension externally beyond said inclosure mounting one of said pulleys, which pulley comprising a pair of sections having opposed inclined V-belt engaging faces, forming by relative axial adjustment variable effective diameter, for an endless V-belt in active driving relationship to said pulleys, drive means engaging said sections and their respective shaft and thereby causing uniform rotation between the sections and its shaft, and an end portion of said drive means extending into said inclosure, said control means providing mechanical control for varying said speed, and a portion of said control means being disposed within said inclosure operably connected to said end portion, a fluid lubricant within said inclosure, a fluid propulsion means mounted within said inclosure operably connected to the shaft mounting said sections, said propulsion means extending to said fluid so that upon operation of said mechanism it causes a part of the fluid being propelled above the normal level of the fluid pool within the inclosure, and thereby causing mechanically a continual wetting of the actuating surfaces of said end portion and said portion of the control means disposed within the inclosure by said fluid and wherein the excess fluid returning to said fluid pool for recirculation by said propulsion means.

References Cited in the file of this patent

UNITED STATES PATENTS

| | | |
|---|---|---|
| 1,099,916 | Cushman | June 16, 1914 |
| 1,794,921 | Ramsey | Mar. 3, 1931 |
| 1,988,440 | Cotterman | Jan. 22, 1935 |
| 2,205,975 | Heyer | June 25, 1940 |
| 2,326,508 | Whitcomb | Aug. 10, 1943 |
| 2,475,954 | Gerbing | July 12, 1949 |
| 2,582,067 | Reeves | Jan. 8, 1952 |
| 2,703,986 | McClelland | Mar. 15, 1955 |